Figure 1:
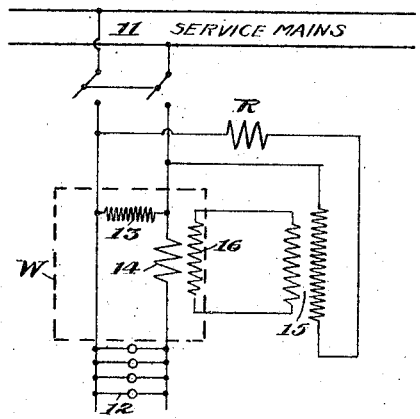

A. W. BURKE.
EXCESS WATTMETER.
APPLICATION FILED JAN. 21, 1914.

1,175,508. Patented Mar. 14, 1916.

Witnesses:
E. C. Tate
C. H. Potter

Alfred W. Burke
Inventor:
by Byrnes Townsend & Brickenstein
Attys.

UNITED STATES PATENT OFFICE.

ALFRED W. BURKE, OF WILMINGTON, DELAWARE.

EXCESS-WATTMETER.

1,175,508.

Specification of Letters Patent. Patented Mar. 14, 1916.

Application filed January 21, 1914. Serial No. 813,494.

*To all whom it may concern:*

Be it known that I, ALFRED W. BURKE, a subject of the King of Great Britain, residing at Wilmington, in the county of New Castle and State of Delaware, have invented certain new and useful Improvements in Excess-Wattmeters, of which the following is a specification.

My invention relates to recording watt-meters, such as are used on alternating current circuits, and has for its object to record only the electrical energy consumed in excess of a certain predetermined value. The meter is especially intended for use on circuits where the consumer is charged a flat rate for a limited maximum consumption, and is designed to register only the electrical energy that may be used in excess of the flat rate value, and not to register during the time the energy consumed equals or is less than the value contracted for.

Many devices are in common use having in view the object of notifying a consumer when the maximum current is being consumed; these devices generally resemble circuit-breakers, and operate by making and breaking the circuit, and are so connected in the circuit as to cause the lights to flicker when the current exceeds the predetermined amount. The contact-points in such apparatus frequently give rise to defective connections, causing irregularities in the service. It is to be observed that with devices of this character, the amount of current the consumer can take is limited, and further that the revenue the central station obtains is also limited.

One object of my invention is to eliminate all make-and-break devices, and to allow the consumer to use an increased quantity of current, measuring only the excess current used. In my invention, this result may be accomplished by acting on the armature of the watt-meter with a magnetic flux equal to and opposite in direction to that generated by the usual series coil of the watt-meter when the contracted quantity of electrical energy is being consumed, in such a manner as to balance and neutralize the flux generated by the series coil when the specified current is passing. Thus, if a consumer contracts for two hundred watts of electric energy, to be supplied at say one hundred volts, the current contracted for will be two amperes. The series coil in the watt-meter will have, at two amperes, 2 X ampere-turns; and the neutralizing magnetic flux will be generated by a coil also having 2 X ampere turns; the meter therefore will not register. If the current consumed reaches two and one-half amperes, the series coil will generate a magnetic flux equal to 2.5 X ampere-turns, while the neutralizing coil will still generate the same flux produced by its 2 X ampere-turns; the meter accordingly will register the excess current, or one-half ampere. With a consumption of three amperes, the meter will register the excess one ampere of current. With a consumption of less than two amperes, there would be a tendency for the meter to reverse, due to the flux of the neutralizing coil having a greater value than that generated by the series coil; this is prevented, however, by placing a suitable brake, such as a ratchet wheel, on the spindle or shaft of the rotating armature, and a fixed coöperating pawl preventing its rotation in the reverse direction. In place of the pawl and ratchet, any of the well known equivalent intermittent-grip devices, such as a strap and dog, or ball, may be used. Another way of accomplishing the same result is to wind a transformer with three coils, one of which is in series with the line and carries the full current. A second coil is of many turns and is connected in shunt to the line; this coil has a predetermined value and its flux just neutralizes and balances the flux generated by the series current when the current contracted for is passing. Any excess of current induces an E. M. F. in the third coil, the resulting current passing through the series coil of the watt-meter. Another way of accomplishing the same result is by balancing the E. M. F. at the terminals of the series coil of the watt-meter by an applied E. M. F. opposite in direction and of a value equal to that normally applied to the series coil when the current contracted for is passing. Thus, in the illustrations above given, with two amperes passing, the E. M. F. at the terminals of the series coil will be Y-volts; the applied neutralizing E. M. F. should therefore also have the value of Y-volts. With an increase in current consumption the E. M. F. at the series coil will equal Y+"$a$" volts; the excess, or "$a$" volts will then be the quantity of energy that is measured, it causing a current to pass the series coil in such a direction that it produces a magnetic flux that operates the meter in proportion to its value.

Figure 2:
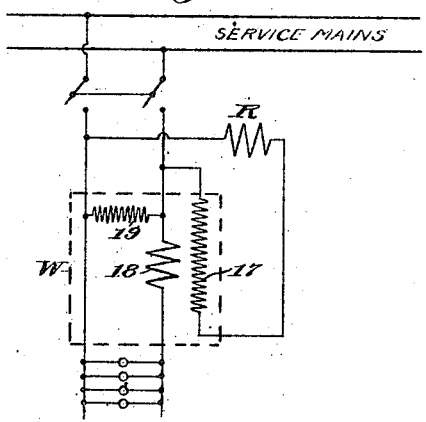
Figure 3:
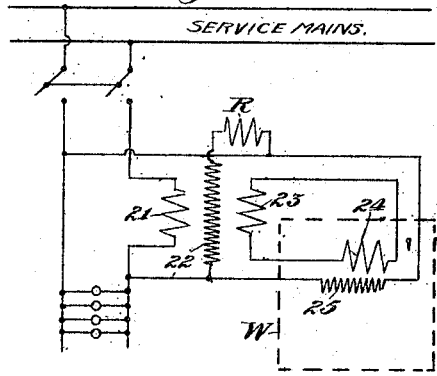
Figure 4:
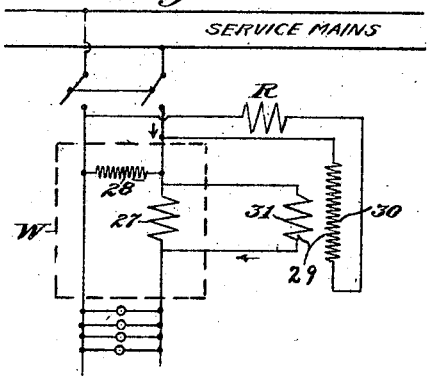
Figure 5:
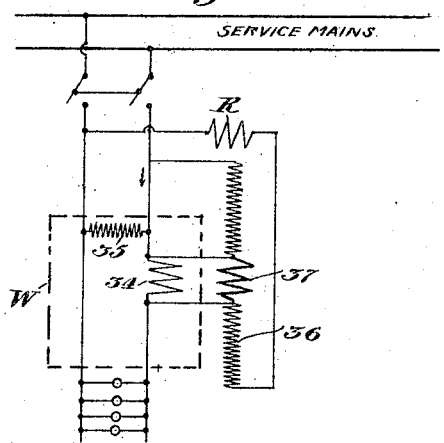
Figure 6:
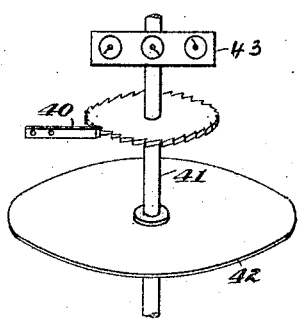

In the drawings,—Figures 1 and 2 are diagrams showing the electrical connections for the watt-meter in which a predetermined neutralizing magnetic flux is used to control the operation of the meter; Fig. 3 is a diagram showing a method of applying a current of a value only equal to the excess current consumed, to the series coil of the watt-meter; Figs. 4 and 5 are diagrams showing electrical connections for the watt-meter in which a predetermined neutralizing E. M. F. is applied to the series coil to control the operation of the meter; and Fig. 6 shows a pawl and ratchet device applied to the armature shaft to prevent the meter from rotating in the reverse direction.

In Fig. 1, current from the service mains 11 is utilized to operate lamps or other translating devices 12. The watt-meter, shown diagrammatically at W, contains the usual shunt coil 13 and series coil 14. An independent transformer 15 generates a secondary current of constant value which is passed through the neutralizing coil 16, its ampere turns, and therefore its magnetic flux, being equal to and opposite to that of the series coil 14 when the current contracted for is passing. Under these conditions, there will be no "pull" exerted upon the armature of the watt-meter, and consequently it will not register. When the current consumed exceeds the value contracted for, the ampere-turns of the series coil 14 will exceed that of the coil 16, and the magnetic flux due to the excess ampere-turns will exert a corresponding "pull" upon the armature, proportional to the excess ampere-turns. With currents of less value than that contracted for, the tendency would be for the armature to rotate in the opposite direction; this, however, is prevented by its being mechanically checked.

In Fig. 2, the neutralizing coil 17 consists of a shunt coil of many turns, having a total number of ampere-turns equal to that of the series coil 18 when the current of a value contracted for is being used. The coil 17 is placed in the watt-meter, and in such relation to the series coil and the armature, either by being superimposed, or by so locating that the tendency of the armature to rotate is controlled by the resultant "pull" of the two coils. With a current in excess of that contracted for, the excess ampere-turns in series coil 18 operates the armature; when a current of the value contracted for is passing, the magnetic forces are balanced, and there is no rotation; with currents of less value, reverse rotation of the armature is prevented mechanically.

In Fig. 3, the series coil 21, which carries the current consumed, constitutes one primary coil of a three-coil transformer; shunt coil 22, constituting a second primary coil thereof, is so designed that its ampere-turns neutralize and balance the ampere-turns of coil 21 when the current contracted for is passing through coil 21; coil 23 constitutes the secondary circuit, and is connected to the series-coil 24 of the watt-meter. When the current contracted for is passing, no current is induced in coil 23, since coils 21 and 22 neutralize each other; when an excess current is passing through coil 21, a current is induced in coil 24 due to the difference in the ampere-turns in coils 21 and 22, this induced current passing through coil 24 of the watt-meter, and this, in conjunction with the shunt-coil 25, operates the watt-meter.

In Fig. 4, the current in the consumer's circuit passes through the series coil 27 in the watt-meter, which contains also the shunt coil 28. Shunted across the consumer's mains is a step-down transformer 29 having a fine-wire primary 30, and a coarse-wire secondary 31, the latter being connected to the terminals of the series coil 27. The coil 31 is so proportioned that the E. M. F. induced therein equals that at the terminals of coil 27 when the current contracted for is consumed, the connections of coil 31 to that of coil 27 being such that the passage of the main current through coil 27 is opposed and neutralized when it equals or is less than the quantity contracted for; when it exceeds this amount, the E. M. F. at the terminals of coil 27 exceed that of coil 31, and the excess current actuates the watt-meter proportionally to the amount of the excess only; the main current other than the excess passing around through coil 31.

In Fig. 5, the main current passes through the series coil 34 of the watt-meter, containing also the shunt coil 35. Connected across the consumer's mains is the auto-transformer 36, of many turns, a section of which 37, consists of relatively coarse wire, and is so proportioned that the E. M. F. at its terminals equals that at the terminals of the series coil 34 when the current contracted for is consumed. The section 37 is so connected to the coil 34 as to oppose and neutralize the passage of the main current when the latter equals or is less than the current contracted for. When the main current exceeds the specified quantity, the E. M. F. at the terminals of coil 34 exceeds that at the terminals of coil 37, and the excess current passes through coil 34, actuating the watt-meter proportionally to its quantity; the remaining part of the current consumed (the current contracted for) passing through coil 37.

In each of the above illustrations, a resistance R is connected in that part of the circuit which is the source of the neutralizing current. This resistance may be varied at will, and is for the purpose of adjusting the current to its required value. In lieu of a resistance, a reactance may be used.

In all the above illustrations, there would be no tendency for the watt-meter to operate when the current contracted for is being consumed; with currents of less value, the watt-meter would operate in the reverse direction, this, however, is prevented by the use of a suitable brake such as an intermittent-grip device, a pawl-and-ratchet 40 being shown attached to the spindle 41 of the armature 42. Any other equivalent device, either mechanical, electrical, or magnetic, may be used to accomplish the same result.

To the armature spindle 41 is connected a suitable registering mechanism 43.

I claim:—

1. In a system of measuring electric currents, a series coil, a transformer, one section of said transformer connected so as to constitute a neutralizing and balancing agent to said series coil, and a rotating element arranged to be actuated by the component of a current to be measured in said series coil in excess of that neutralized and balanced by said transformer section.

2. In an apparatus for measuring electric currents, a watt-meter, a series coil therein, a transformer connected across the mains carrying the current to be measured, and a section of said transformer connected to the terminals of said series coil.

3. In an apparatus for measuring electric currents, a watt-meter, a series coil therein, an auto-transformer connected across the mains carrying the current to be measured, and a section of said auto-transformer connected to the terminals of said series coil.

4. In an apparatus for measuring electric currents, a watt-meter, a series coil therein, a transformer connected across the mains carrying the current to be measured, a section of said transformer connected to the terminals of said series coil, and means to prevent said watt-meter from registering in the wrong direction.

5. The method of measuring electric currents, which comprises applying to a measuring instrument coil a balancing electric current producing effects on said instrument coil equal and opposite to the effects of a predetermined current strength, said balancing electric current normally reversing the effects of said measuring instrument coil, preventing the reversing of said instrument, and actuating a movable element in said instrument by the effects of the current to be measured in excess of the effects produced by said balancing current.

6. The method of measuring electric currents which comprises passing the current to be measured through an actuating coil of a measuring instrument, applying an opposing electromotive force to the terminals of said coil equal to the difference of potential at the terminals of said coil when a current of predetermined strength is passing, thereby neutralizing and balancing the effects of said predetermined current strength, and actuating a movable element in said instrument by the current in excess of said predetermined current strength.

7. The method of measuring electric currents, which comprises passing the current to be measured through a coil in series with translating devices, passing a current through a transformer coil in shunt with said translating devices, applying an opposing current from said transformer to said series coil, thereby neutralizing and balancing a predetermined current strength in said series coil, and actuating a movable element in a measuring instrument by the current in said series coil in excess of said predetermined current strength.

8. The method of measuring electric currents, which comprises passing the current to be measured through a coil in series with translating devices, passing a current through an auto-transformer in shunt with said translating devices, connecting a section of said auto-transformer to said series coil and thereby neutralizing and balancing a predetermined current strength in said series coil, and actuating a movable element in a measuring instrument with a current in excess of said predetermined current strength.

In testimony whereof I affix my signature in presence of two witnesses.

ALFRED W. BURKE.

Witnesses:
ALFRED W. GREGG,
JAMES W. ROBERTSON.